United States Patent [19]

Nakatani et al.

[11] 4,430,713
[45] Feb. 7, 1984

[54] PLU-CODE CONTROLLED ELECTRONIC CASH REGISTER

[75] Inventors: Hiroshi Nakatani; Masahide Ishida, both of Yamatokoriyama; Hachizou Yamamoto, Nara, all of Japan

[73] Assignee: Sharp Kabushiki Kaisha, Osaka, Japan

[21] Appl. No.: 147,165

[22] Filed: May 6, 1980

[30] Foreign Application Priority Data

May 7, 1979 [JP] Japan .................................. 54-56122
May 7, 1979 [JP] Japan .................................. 54-56123

[51] Int. Cl.³ .............................................. G06F 15/20
[52] U.S. Cl. .................................... 364/405; 364/709; 381/51
[58] Field of Search ............... 364/405, 709, 710, 200, 364/900; 179/1 SM

[56] References Cited

U.S. PATENT DOCUMENTS

| | | | |
|---|---|---|---|
| 3,330,947 | 7/1967 | Alpert et al. ......................... | 364/405 |
| 3,356,836 | 12/1967 | Stenby .............................. | 179/1 SM |
| 3,710,085 | 1/1973 | Brewer et al. . | |
| 3,748,452 | 7/1973 | Ruben ............................. | 364/405 |
| 3,898,396 | 8/1975 | Gushue et al. .................. | 179/1 SM |
| 3,979,057 | 9/1976 | Katz et al. ...................... | 364/709 |
| 4,060,848 | 11/1977 | Hyatt .............................. | 364/200 |
| 4,107,784 | 8/1978 | Van Bemmelen ................ | 364/900 |
| 4,144,567 | 3/1979 | Tadakuma et al. .............. | 364/405 |
| 4,159,533 | 6/1979 | Sakurai . | |
| 4,172,285 | 10/1979 | Yoshida et al. .................. | 364/710 |
| 4,185,170 | 1/1980 | Morino et al. .................. | 179/1 SM |
| 4,211,892 | 7/1980 | Tanimoto et al. ................ | 179/1 SM |

FOREIGN PATENT DOCUMENTS

2818370 11/1978 Fed. Rep. of Germany ... 179/1 SM

OTHER PUBLICATIONS

Chapman; "Prospectives in Voice Response from Computers"; Proc. of Int'l. Conf. on Communications; 1970; pp. 45-8 to 45-8.

*Primary Examiner*—Errol A. Krass
*Attorney, Agent, or Firm*—Birch, Stewart, Kilasch & Birch

[57] ABSTRACT

An electronic cash register includes a PLU (Price-lookup) function, wherein merchandise information such as a unit cost, taxation information and classification information is preset for each commodity by an operator. For presetting the PLU code information, a "PLU" key is actuated for automatically developing a PLU code signal in a progressive order. A synthetic speech sound generation system is provided for first generating a synthetic speech respresentation of "PLU number one". Then, the synthetic speech sound generation system provides a synthetic speech representation of "unit cost" for audibly instructing an operator to introduce the unit cost information. Thereafter, synthetic speech representation of "taxation" and "classification" are provided to audibly instruct the operator of a required key operation, thereby facilitating the preset operation of the PLU code information.

9 Claims, 8 Drawing Figures

FIG.4(A) | PLU    001          | ($N_{11}$)

FIG.4(B) | PLU    001    123   | ($N_{12}$)

FIG.4(C) | PLU    001    123T  | ($N_{13}$)

FIG.4(D) | PLU    002          | ($N_{15}$)

| PLU   001   COST        TAX       CLASS |

FIG. 5

000
PLU-CODE CONTROLLED ELECTRONIC CASH REGISTER

BACKGROUND AND SUMMARY OF THE INVENTION

The present invention relates to an electronic cash register employing a PLU (price-look-up) function and, more particularly, to an operation sequence announcing system for audibly instructing an operator of an operation sequence for presetting merchandise information.

An electronic cash register employing a PLU function has been developed, wherein a PLU code is assigned to each commodity. Each PLU code includes various types of merchandise information related to the commodity, for example, the unit cost, the classification, and the taxation. Accordingly, for registering the transaction information, the clerk is only required to select the corresponding PLU code and introduce the number of commodity articles.

It will be clear that the PLU code must be preset for every article. Moreover, the PLU code must be added when a new article is introduced, and the PLU code must be modified when, for example, the unit cost is changed. It is very likely that a single store handles articles more than one hundred and, therefor, it is strictly required to facilitate the preset operation of the PLU code.

Accordingly, an object of the present invention is to provide a novel electronic cash register employing a PLU (price-look-up) function.

Another object of the present invention is to simplify the preset operation of the PLU code in an electronic cash register.

Still another object of the present invention is to provide a novel check system of the PLU code which is preset in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an operation sequence instruction system is provided for instructing an operator of an operation sequence for presetting a PLU code. The operation sequence instruction system includes a digital display system for displaying information related to the unit cost, the classification, the taxation, etc. which are required for presetting the PLU code, and an announce system for audibly instructing the operator of a required key operation.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 4(A) through 4(D) are plan views showing display conditions of a display unit in steps shown in FIG. 3; and FIG. 5 is a plan view of another embodiment of the display unit of the electronic cash register of the present invention.

DESCRIPTION OF THE PREFERRED EMBODIMENTS

Figure 1:
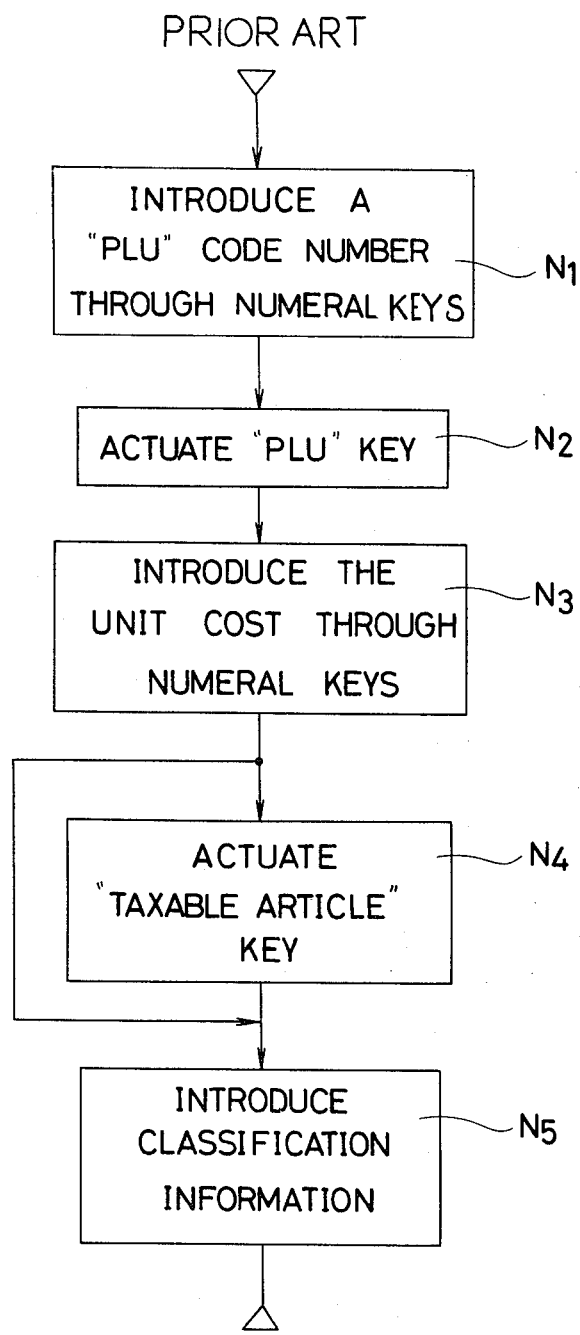
FIG. 1 is a flow chart showing a basic operation for presetting PLU code information in an electronic cash register.

In order to facilitate a more complete understanding of the present invention, a basic operation for presetting PLU code information in the conventional electronic cash register will be first described with reference to FIG. 1.

A PLU code number is first introduced through the numeral keys at a first step $N_1$. Then, a "PLU" key is actuated at a second step $N_2$, and the unit cost information is registered through the numeral keys at a third step $N_3$. If the commodity is taxable, a "TAXABLE ARTICLE" key is actuated at a step $N_4$. If the commodity is a tax-free-article, the step $N_4$ is skipped. Thereafter, the classification information is introduced through the use of a plurality of department keys.

Figure 2:
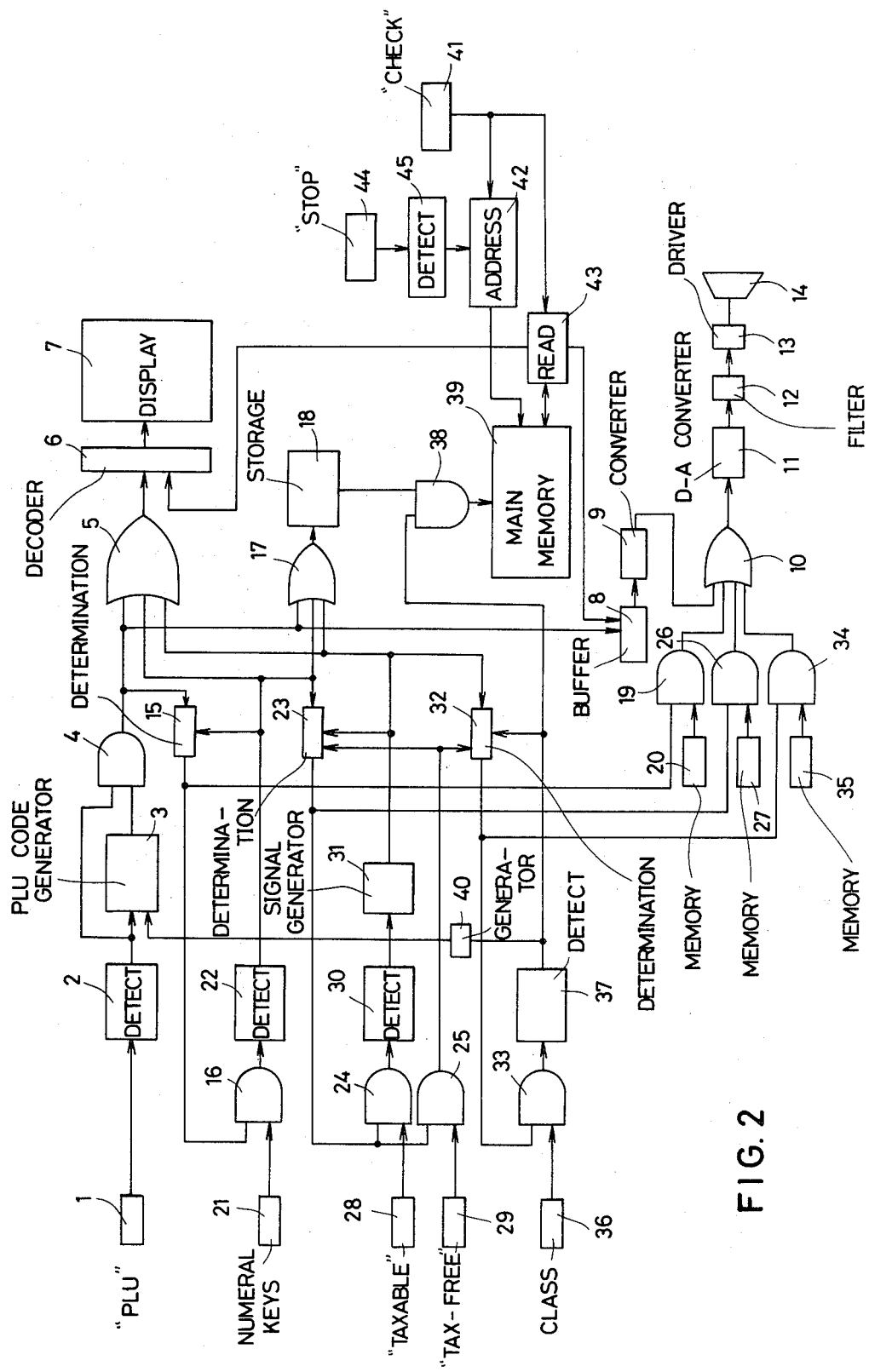
FIG. 2 is a block diagram of an essential part of an embodiment of an electronic cash register of the present invention.

FIG. 2 shows an essential part of an embodiment of an electronic cash register of the present invention.

An electronic cash register of the present invention mainly comprises a keyboard panel including a "PLU" key 1 for initiating the preset operation of the PLU code information, numeral keys 21 for introducing numeral information, a "TAXABLE" key 28 for indicating that the commodity is a taxable article, a "TAX-FREE" key 29 for indicating that the commodity is a tax-free article, and classification keys 36 for identifying a department to which the commodity belongs.

Figure 3:
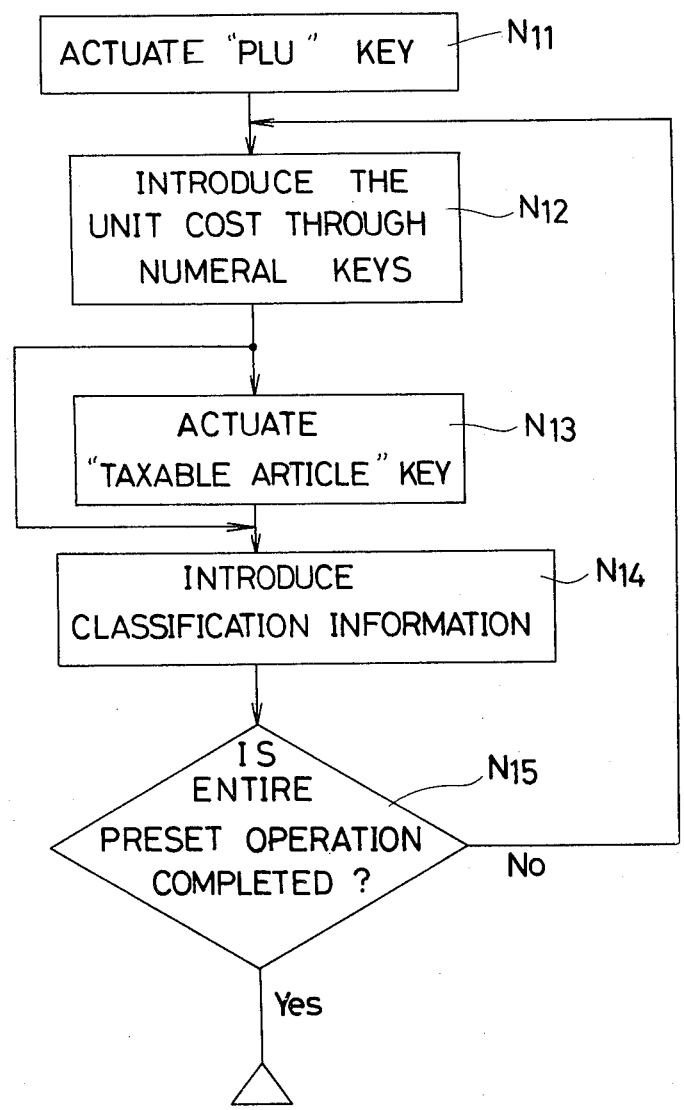
FIG. 3 is a flow chart showig an operation for presetting PLU code information in the electronic cash register of FIG. 2.

To initiate the preset operation of the PLU code, the "PLU" key 1 is actuated at a first step $N_{11}$ (see FIG. 3). The actuation of the "PLU" key 1 is detected by a PLU key detection unit 2, which develops a detection output of the logic high toward a PLU code generation circuit 3 and an AND gate 4. When the detection output of the PLU key detection unit 2 is applied to the PLU code generation circuit 3, the PLU code generation circuit 3 develops a first PLU code signal which is applied to a decoder 6 through the AND gate 4 and an OR gate 5. In this way, a digital display unit 7 displays "PLU 001" as shown in FIG. 4(A).

An output signal of the AND gate 4 is temporarily stored in a buffer register 8, and converted into a synthetic speech data by a converter 9 for providing a synthetic speech indicating that the PLU code which should be preset is number one. The thus obtained synthetic speech data is applied to a digital-to-analog converter 11 through an OR gate 10. The analog signal derived from the digital-to-analog converter 11 is applied to a speaker driver circuit 13 via a low-pass filter 12 for activating a speaker 14, thereby providing an audible announcement, "PLU number one".

The output signal of the AND gate 4 is also applied to a determination circuit 15, of which an determination output is applied to an AND gate 16 to make it conductive. The output signal of the AND gate 4 is further applied to a temporary storage 18 via an OR gate 17.

The determination output of the determination circuit 15 is also applied to an AND gate 19 which passes a synthetic speech data stored in a memory 20 toward the OR gate 10. The memory 20 stores the synthetic speech data for effecting the synthetic speech of "unit cost". Accordingly, the speaker 14 develops the synthetic speech, "unit cost", for instructing the operator of introduction of the unit cost information after completion of the synthetic speech of "PLU number one".

Then, the operator introduces the unit cost information through the use of the numeral keys 21 (step $N_{12}$ shown in FIG. 3). The thus introduced unit cost information is applied to a detection circuit 22 through the AND gate 16, and displayed at the digital display unit 7 as shown in FIG. 4(B).

The unit cost information derived from the detection circuit 22 is also applied to the determination circuit 15 to reset it, which has been set by the output signal of the AND gate 4. In this way, the AND gate 16 is made nonconductive after introduction of the unit cost information. The unit cost information derived from the detection circuit 22 further functions to set a state determination circuit 23. A determination set output of the state determination circuit 23 is applied to AND gates 24 and 25 to make them conductive. The unit cost information derived from the detection circuit 22 is stored in the temporary storage 18 via the OR gate 17.

The determination set output of the state determination circuit 23 is further applied to an AND gate 26 which passes a synthetic speech data stored in a memory 27. The memory 27 stores the synthetic speech data for instructing the operator to select whether the commodity is a taxable article or a tax-free article. In this way, the speaker 14 develops the synthetic speech announcement of "taxation" when the introduction of the unit cost information is completed.

If the commodity is the taxable article, the operator actuates the "TAXABLE" key 28 at a ste $N_{13}$ as shown in FIG. 3. The actuation of the "TAXABLE" key 28 is detected by a taxation detection circuit 30 via the AND gate 24. A detection output of the taxation detection circuit 30 is applied to a signal generator 31 which develops a code signal for indicating the taxable article. The thus obtained code signal is applied to the decoder 6 through the OR gate 5 for displaying a symbol, for example "T", on the digital display unit 7 as shown in FIG. 4(C).

The code signal derived from the signal generator 31 functions to reset the state determination circuit 23 for disabling the AND gates 24 and 25. The code signal derived from the signal generator 31 is further applied to the temporary storage 18 via the OR gate 17. The code signal derived from the signal generator 31 further functions to set a determination circuit 32, of which a set output enables an AND gate 33.

If the commodity is the tax-free article, the operator actuates the "TAX-FREE" key 29. The key actuation output signal of the "TAX-FREE" key 29 is applied, through the AND gate 25, to the state determination circuit 23 for resetting it. The AND gates 24 and 25 are disabled, and the AND gate 33 is enabled via the determination circuit 32.

The set output of the determination circuit 32 is also applied to an AND gate 34 which passes a synthetic speech data stored in a memory 35. The memory 35 stores the synthetic speech data for audibly instructing the operator to introduce the classification information. In this way, the speaker 14 develops the synthetic speech, "classification".

Then, the operator actuates one of the classification keys 36 for classifying the commodity (step $N_{14}$ shown in FIG. 3). When one of the classification keys 36 is actuated, a classification detection circuit 37 detects the classification information through the AND gate 33. An output signal of the classification detection circuit 37 enables an AND gate 38, whereby the merchandise information temporarily stored in the temporary storage 18 is introduced into a main memory 39 and stored in a corresponding memory screen of the main memory 39.

The output signal of the classification detection circuit 37 functions to reset the determination circuit 32, and to activate the step-up signal generator 40. The step-up signal generator 40 develops a step-up signal which is delivered to the PLU code generation circuit 3 (step $N_{15}$ in FIG. 3), whereby the PLU code generation circuit 3 automatically develops a second PLU code signal. In this way, the digital display unit 7 displays the information as shown in FIG. 4(D), and the speaker 14 develops the synthetic speech announcement of "PLU number two".

The above-mentioned operation is repeated to preset the entire PLU code information.

FIG. 5 shows another embodiment of the digital display unit 7 shown in FIGS. 4(A) through 4(D).

The electronic cash register of the present invention further comprises a "CHECK" key 41 for checking the PLU code information. When the "CHECK" key 41 is actuated, an address circuit 42 and a read-out control circuit 43 are enabled to sequentially read out the PLU code information memorized in the main memory 39 from the PLU number one. The PLU code information sequentially read out by the read-out control circuit 43 is applied to the digital display unit 7 and the synthetic speech system for checking purposes.

When an erroneously preset PLU code information is found out, a "STOP" key 44 is actuated to terminate the sequential addressing operation of the address circuit 42 through a key actuation detection circuit 45. Thereafter, correct PLU code information is introduced and stored in the main memory 39.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electronic cash register employing a PLU (price-look-up) function, wherein merchandise information such as unit cost, taxation information and classification information is preset by an operator, a PLU code information preset system comprising:
   first means for automatically developing PLU code signals in a progressive order;
   a synthetic speech generation system for audibly instructing an operator of a necessary key operation for presetting the PLU code information associated with each PLU code signal;
   a digital display unit for displaying the presently introduced PLU code information;
   memory means for storing the introduced preset PLU code information;

addressing means for introducing the preset PLU code information into a predetermined memory section of the memory means;

a check request key; and read-out means for reading out the PLU code information stored in said memory means in a progressive order in response to actuation of said check request key;

said synthetic speech generation system further including means for sequentially providing a synthetic speech sound in accordance with said PLU code information read out by said read-out means.

2. The electronic cash register of claim 1, wherein said synthetic speech generation system further includes:

second means for audibly announcing a PLU code number in response to the PLU code signal derived from said first means;

third means for developing a synthetic speech sound for instructing the operator to introduce the unit cost information; and fourth means for developing a synthetic speech sound for instructing the operator to introduce the classification information.

3. A system for loading commodities information into a memory of an electronic cash register, said system comprising:

means for sequentially producing code signals and for providing each of these signals to an operator, each of said code signals being representative of an item of merchandise; and input means for entering data representative of commodities information into the memory, said commodities information being identified in the memory by its associated code signal received from said means for sequentially producing and providing and being representative of the item of merchandise and its associated commodities information;

said means for sequentially producing and providing including:

means for incrementing a current code signal after the completion of entry of the data corresponding to this current code signal by said input means to produce a new code signal; and a synthetic speech generator responsive to said means for sequentially producing code signals, said synthetic speech generator audibly announcing each code signal when produced.

4. The system of claim 3 wherein said synthetic speech generator comprises:

means for converting said code signals into digital representations of their audible form;

analog converter means for converting said digital representations into an analog signal; and speaker means for converting said analog signal into said audible annunciation of the corresponding code signal.

5. The system of claim 3 wherein said synthetic speech generator further comprises means for audibly instructing the user to introduce the data representative of commodities information into the memory.

6. The system of claim 3, wherein said means for sequentially producing and providing includes a display for allowing the operator to view both code signals produced by said means for sequentially producing and providing and said data representative of said commodities information entered by said input means.

7. The system of claims 3 or 5, wherein said commodities information includes unit cost information.

8. The system of claims 3 or 5, wherein said commodities information includes classification information.

9. The system of claims 3 or 5, wherein said commodities information includes tax information.

* * * * *